United States Patent
Wang et al.

(10) Patent No.: US 12,114,384 B2
(45) Date of Patent: Oct. 8, 2024

(54) COMMUNICATION METHOD, APPARATUS, AND SYSTEM

(71) Applicant: HUAWEI TECHNOLOGIES CO., LTD., Guangdong (CN)

(72) Inventors: Rui Wang, Shanghai (CN); Wenjie Peng, Shanghai (CN); Mingzeng Dai, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 17/245,112

(22) Filed: Apr. 30, 2021

(65) Prior Publication Data

US 2021/0251032 A1    Aug. 12, 2021

Related U.S. Application Data

(63) Continuation of application No. PCT/CN2019/112518, filed on Oct. 22, 2019.

(30) Foreign Application Priority Data

Nov. 2, 2018 (CN) .......................... 201811302848.4

(51) Int. Cl.
*H04W 76/18* (2018.01)
*H04W 12/04* (2021.01)
(Continued)

(52) U.S. Cl.
CPC ........... *H04W 76/18* (2018.02); *H04W 12/04* (2013.01); *H04W 12/10* (2013.01); *H04W 76/15* (2018.02); *H04W 76/19* (2018.02); *H04W 76/27* (2018.02)

(58) Field of Classification Search
CPC ..... H04W 76/18; H04W 76/19; H04W 76/15; H04W 76/27; H04W 12/04; H04W 12/10
See application file for complete search history.

(56) References Cited

FOREIGN PATENT DOCUMENTS

| CN | 105075363 A | 11/2015 |
|----|-------------|---------|
| CN | 105101253 A | 11/2015 |

(Continued)

OTHER PUBLICATIONS

Office Action issued in Chinese Application No. 201811302848.4 on Aug. 27, 2021, 31 pages (with English translation).

(Continued)

*Primary Examiner* — Samina F Choudhry
(74) *Attorney, Agent, or Firm* — Fish & Richardson P.C.

(57) ABSTRACT

This application relates to the field of wireless communications technologies, and in particular, to a communication method, apparatus, and system. This application provides a communication method. The method includes: a user equipment sends a first message to a secondary base station, where the first message is used to indicate that an exception occurs on a connection between the user equipment and a master base station; and the user equipment receives a second message sent by the secondary base station, where the second message is used to indicate whether to recover the connection to the master base station. This aims to quickly recover the connection between the user equipment and the master base station through interaction between the user equipment and the secondary base station, thereby reducing interruptions of data transmission and/or signaling transmission, and further improving system performance and user experience.

21 Claims, 4 Drawing Sheets

(51) Int. Cl.
*H04W 12/10* (2021.01)
*H04W 76/15* (2018.01)
*H04W 76/19* (2018.01)
*H04W 76/27* (2018.01)

(56) References Cited

FOREIGN PATENT DOCUMENTS

| | | | | | |
|---|---|---|---|---|---|
| CN | 105338653 | A | 2/2016 | | |
| CN | 105453649 | A | 3/2016 | | |
| CN | 106454910 | A | 2/2017 | | |
| CN | 106465435 | A | 2/2017 | | |
| CN | 107925931 | A | 4/2018 | | |
| TW | 201519689 | A | * 5/2015 | ............ | H04W 36/04 |
| WO | 2014182233 | A2 | 11/2014 | | |
| WO | WO-2015030483 | A1 | * 3/2015 | ......... | H04L 41/0686 |
| WO | 2017022167 | A1 | 2/2017 | | |
| WO | 2018128572 | A1 | 7/2018 | | |
| WO | 2018171577 | A1 | 9/2018 | | |

OTHER PUBLICATIONS

3GPP TS 37.340 V15.3.0 (Sep. 2018), "3rd Generation Partnership Project; Technical Specification Radio Access Network;Evolved Universal Terrestrial Radio Access(E UTRA) and NR; Multi connectivity;Stage 2(Release 15)," Sep. 2018, 59 pages.

Ericsson, "MCG failure handling in case of NE-DC and NN DC (TP to 37.340)," 3GPP TSG-RAN WG2 #103, R2-1812017, Gothenburg, Sweden, Aug. 20-24, 2018, 5 pages.

Ericsson, "RLM and RLF in case of LTE-NR tight interworking," 3GPP TSG-RAN WG2 #97, R2-1700918, Athens, Greece, Feb. 13-17, 2017, 3 pages.

Extended European Search Report issued in European Application No. 19879735.9 on Nov. 4, 2021, 12 pages.

Intel Corporation, "Discussion on bearer split for SRB," 3GPP TSG-RAN2 Meeting #84, R2-134404, San Francisco, USA, Nov. 11-15, 2013, 3 pages.

LG Electronics Inc., "Supplementary SRB in MCG failure for LTE-NR interworking," 3GPP TSG-RAN WG2 #97, R2-1701634, Athens, Greece, Feb. 13-17, 2017, 3 pages.

LG Electronics Inc., "Supplementary SRB in MCG failure for NR," 3GPP TSG-RAN WG2 #97, R2-1701639, Athens, Greece, Feb. 13-17, 2017, 3 pages.

Ericsson, "MCG failure handling in case of NE-DC and NR-DC," 3GPP TSG-RAN WG2#103bis, R2-1814559, Chengdu, China, Oct. 8-12, 2018, 4 pages.

Ericsson, "MCG failure handling in case of NE-DC and NR-DC(CR to 37.340)," 3GPP TSG-RAN2 Meeting #103bis, R2-1814560, Chengdu, China, Oct. 8-12, 2018, 2 pages.

Office Action issued in Chinese Application No. 201811302848.4 on Mar. 1, 2021, 28 pages (with English translation).

PCT International Search Report and Written Opinion issued in International Application No. PCT/CN2019/112518 on Jan. 23, 2020, 15 pages (with English translation).

Sony, "Considerations on multi-beam operation," 3GPP TSG-RAN WG1 #95, R1-1812748, Spokane, USA, Nov. 12-16, 2018, 8 pages.

* cited by examiner

COMMUNICATION METHOD, APPARATUS, AND SYSTEM

CROSS-REFERENCE TO RELATED APPLICATIONS

This application is a continuation of International Patent Application No. PCT/CN2019/112518, filed on Oct. 22, 2019, which claims priority to Chinese Patent Application No. 201811302848.4, filed on Nov. 2, 2018. The disclosures of the aforementioned applications are hereby incorporated by reference in their entireties.

TECHNICAL FIELD

This application relates to the field of wireless communications technologies, and in particular, to a communication method, apparatus, and system.

BACKGROUND

A dual connectivity technology in the field of wireless communications technologies is a technology in which user equipment performs communication by using radio resources provided by at least two network nodes (a master node and a secondary node) connected with each other. Based on the dual connectivity technology, more radio resources can be used to provide data or signaling transmission for the user equipment. This improves radio resource utilization, reduces a system handover delay, and improves user and system performance.

Due to a change of an air interface condition, an exception may occur on a connection between the user equipment and the master node or the secondary node, and consequently the data or signaling transmission cannot be performed. Because a control plane of the user equipment is usually on the master node, when the exception occurs on the connection between the user equipment and the master node, the user equipment needs to release some configurations of the master node and all configurations of the secondary node, perform cell selection or cell reselection again, perform radio resource control (RRC) connection reestablishment in a selected cell, and perform related security update. The entire procedure takes a relatively long time. In this case, when the exception occurs on the connection between the user equipment and the master node, the data or signaling transmission is interrupted for a relatively long time. Consequently, system performance is reduced, and user experience is affected. In addition, even if the cell selection or cell reselection is performed, the user equipment still establishes a connection to the original master node, and the master node still needs to reconfigure a secondary node for the user equipment. Consequently, signaling load of a network is increased and signaling configuration efficiency is reduced.

Therefore, a method is required to recover the connection between the user equipment and the master node as soon as possible when the exception occurs on the connection.

SUMMARY

This application describes a communication method, apparatus, and system, to quickly recover a connection between user equipment and a master base station through interaction between the user equipment and a secondary base station, thereby reducing interruptions of data transmission and/or signaling transmission, and further improving system performance and user experience.

According to a first aspect, this application provides a communication method. The method includes: User equipment sends a first message to a secondary base station, where the first message is used to indicate that an exception occurs on a connection between the user equipment and a master base station: and the user equipment receives a second message sent by the secondary base station, where the second message is used to indicate the user equipment how to process the connection to the master base station. Optionally, the second message is used to indicate whether to recover the connection to the master base station.

In a dual connectivity scenario, when a fault occurs on the connection between the user equipment and the master base station, for example, the exception occurs, and consequently data transmission and/or signaling transmission between the user equipment and the master base station are/is affected, the user equipment may send, to the secondary base station, a message indicating that the exception occurs, and the secondary base station may indicate, by using the second message, the user equipment how to process the connection to the master base station, thereby avoiding processes such as cell reselection and RRC connection reestablishment that take a relatively long time and that are performed by the user equipment as long as an exception occurs. Therefore, interruptions of the data transmission and/or the signaling transmission are reduced, and system performance and user experience are further improved.

In a possible design, the first message may indicate, by using different information, that the exception occurs. Optionally, the first message includes measurement information of the user equipment for the master base station and/or information about a type of the exception. The first message includes specific measurement information or information about the type of the exception, so that the secondary base station or the master base station can determine, based on the specific information, whether the connection between the user equipment and the master base station can be recovered through the secondary base station.

In a possible design, the type of the exception includes at least one of the following types: a radio link failure, an integrity check failure, an RRC reconfiguration failure, an RRC connection reestablishment failure, and a handover failure.

In a possible design, the user equipment may send the first message to the secondary base station only when a preset condition is met. Optionally, when signal quality of the master base station meets a preset condition and/or the exception is of a specific type, the user equipment sends the first message to the secondary base station. The user equipment may determine, based on the existing measurement information (for example, signal quality information) and/or specific information about the exception, whether the connection between the user equipment and the master base station can be recovered through the secondary base station. In this way, the user equipment can be prevented from still sending the first message in some cases in which it is not suitable to recover the connection to the master base station through the secondary base station, so that a signaling procedure can be simplified, network signaling load can be reduced, and a subsequent processing procedure, for example, processes such as cell reselection and RRC connection reestablishment, can be performed as soon as possible to avoid a longer-time interruption of the data transmission and/or the signaling transmission. Optionally, the specific type may be preset in a system, or may be notified by a base station to the user equipment. Optionally, the specific type includes the radio resource control RRC reconfiguration failure or the integrity check failure.

In a possible design, the user equipment may send the first message by preferentially using a split signaling radio bearer. Using the split signaling radio bearer to send the first message may reduce signaling processing load of the secondary base station. This is because the secondary base station may not process or parse signaling transmitted on the split signaling radio bearer, but transparently transmit or forward the signaling to the master base station. Optionally, the method may further include: The user equipment determines that a split signaling radio bearer is configured: and the user equipment sends the first message to the secondary base station by using the split signaling radio bearer.

In a possible design, the second message includes access information of the master base station, and the method further includes: The user equipment initiates access to the master base station based on the access information. The second message may indicate, by including the access information, the user equipment to recover the connection to the master base station. Optionally, the access information includes at least one of the following information: cell identifier information of the master base station, random access channel resource information of a cell of the master base station, a cell radio network temporary identifier of the user equipment, security configuration information, and configuration information of a signaling radio bearer 1. The user equipment recovers the connection to the master base station based on an indication of the second message. This avoids processes such as cell reselection and RRC reestablishment performed in a current technology, significantly simplifies a signaling procedure, and shortens a transmission interruption time, thereby improving the system performance and user experience.

In a possible design, the second message includes the security configuration information. Optionally, the security configuration information is used to indicate whether the user equipment updates a key. Optionally, the user equipment may determine, based on the security configuration information, a first key used for RRC message encryption and/or a second key used for integrity protection, and use the first key and/or the second key to perform subsequent data and/or signaling transmission with the master base station. Optionally, the user equipment sends a third message to the master base station, where encryption is performed on the third message by using the first key and/or integrity protection is performed on the third message by using the second key, and the third message is used to indicate that the user equipment has recovered the data transmission and signaling transmission with the master base station. The second message includes the security configuration information, so that the user equipment can determine, as soon as possible, a parameter related to a security configuration such as a key that needs to be used for subsequent communication, thereby simplifying a security configuration procedure, and further shortening the interruption time of the data transmission and/or the signaling transmission.

In a possible design, the second message includes radio resource control RRC connection reestablishment indication information or RRC connection release indication information. The second message may indicate, by including the indication information, the user equipment not to recover the connection to the master base station, and specify an operation that needs to be performed by the user equipment in a next step, thereby shortening a signaling procedure and reducing a transmission interruption time.

In a possible design, before sending the first message, the user equipment may further stop data transmission with the secondary base station, and may further stop data transmission and signaling transmission that are performed with the master base station by using an air interface resource of the master base station. Before the connection to the master base station is recovered through the secondary base station, the related transmission is stopped. This can avoid a security configuration conflict that may be caused after the connection to the master base station is subsequently recovered, simplify the security configuration procedure, and reduce the signaling load.

According to a second aspect, an embodiment of this application provides a communication method. The method includes: A secondary base station receives a first message sent by user equipment, where the first message is used to indicate that an exception occurs on a connection between the user equipment and a master base station: the secondary base station notifies, to the master base station, that the exception occurs on the connection between the user equipment and the master base station: the secondary base station receives indication information sent by the master base station, where the indication information is used to indicate whether to recover the connection between the user equipment and the master base station: and the secondary base station sends a second message to the user equipment, where the second message includes the indication information, and the second message is used to indicate the user equipment how to process the connection to the master base station. Optionally, the second message is used to indicate whether to recover the connection to the master base station.

In a dual connectivity scenario, when learning that the exception occurs on the connection between the user equipment and the master base station, the secondary base station may exchange information about the exception with the master base station, to obtain, from the master base station, an indication about how to process the connection between the master base station and the user equipment, and send the indication to the user equipment, thereby avoiding processes such as cell reselection and RRC connection reestablishment that take a relatively long time and that are performed by the user equipment as long as an exception occurs. Therefore, interruptions of data transmission and/or signaling transmission are reduced, and system performance and user experience are further improved.

In a possible design, the indication information is access information of the master base station: or the indication information is radio resource control RRC connection reestablishment indication information or RRC connection release indication information.

In a possible design, the secondary base station receives the first message sent by the user equipment and sends the second message to the user equipment by using a split signaling radio bearer.

In a possible design, the secondary base station receives, by using a signaling radio bearer 3, the first message sent by the user equipment: and before the secondary base station notifies, to the master base station, that the exception occurs on the connection between the user equipment and the master base station, the method further includes: The secondary base station determines, based on the first message, that the exception occurs on the connection between the user equipment and the master base station needs to be notified to the master base station. When the secondary base station uses the signaling radio bearer 3 to interact with the user equipment, the secondary base station may directly process or parse signaling or a message sent by the user equipment.

Therefore, the secondary base station may directly determine, based on information in the first message, whether to notify, to the master base station, that the exception currently occurs. Under such processing, the user equipment can be prevented from still sending the first message in some cases in which it is not suitable to recover the connection between the master base station and the user equipment through the secondary base station, so that a subsequent signaling procedure is avoided, signaling load is reduced, and a transmission interruption time is shortened.

In a possible design, when it is determined that the connection between the user equipment and the master base station does not need to be recovered through the secondary base station, the secondary base station may release a context of the user equipment.

According to a third aspect, an embodiment of this application provides a communication method. The method includes: A master base station receives notification information of a secondary base station, where the notification information is used to notify, to the master base station, that an exception occurs on a connection between user equipment and the master base station: and the master base station sends indication information to the secondary base station, where the indication information is used to indicate whether to recover the connection between the user equipment and the master base station.

In a possible design, the notification information includes measurement information of the user equipment for the master base station and/or information about a type of the exception, and the master base station may determine, based on the measurement information of the user equipment for the master base station and/or the information about the type of the exception, whether to recover the connection between the user equipment and the master base station.

According to a fourth aspect, this application provides a communications apparatus. The communications apparatus has a function of implementing the method according to any one of the first aspect or the possible designs of the first aspect. The function may be implemented by hardware, or may be implemented by hardware executing corresponding software. The hardware or the software includes one or more modules corresponding to the foregoing function. Optionally, the communications apparatus may be user equipment, or a part of apparatus or circuit structure, for example, a chip or a chip system, in user equipment.

According to a fifth aspect, this application provides a communications apparatus. The communications apparatus has a function of implementing the method according to any one of the second aspect or the possible designs of the second aspect. The function may be implemented by hardware, or may be implemented by hardware executing corresponding software. The hardware or the software includes one or more modules corresponding to the foregoing function. Optionally, the communications apparatus may be a network node, for example, a secondary base station, or a part of apparatus or circuit structure, for example, a chip or a chip system, in a network node.

According to a sixth aspect, this application provides a communications apparatus. The communications apparatus has a function of implementing the method according to any one of the third aspect or the possible designs of the third aspect. The function may be implemented by hardware, or may be implemented by hardware executing corresponding software. The hardware or the software includes one or more modules corresponding to the foregoing function. Optionally, the communications apparatus may be a network node, for example, a master base station, or a part of apparatus or circuit structure, for example, a chip or a chip system, in a network node.

According to a seventh aspect, this application provides a communications apparatus, including a processor. The processor is configured to: be coupled to a memory: and read and execute instructions in the memory, to implement the method according to any one of the first aspect or the possible designs of the first aspect. Optionally, the communications apparatus may further include the memory. Optionally, the communications apparatus is user equipment.

According to an eighth aspect, this application provides a communications apparatus, including a processor. The processor is configured to: be coupled to a memory: and read and execute instructions in the memory, to implement the method according to any one of the second aspect or the possible designs of the second aspect. Optionally, the communications apparatus may further include the memory. Optionally, the communications apparatus is a secondary base station.

According to a ninth aspect, this application provides a communications apparatus, including a processor. The processor is configured to: be coupled to a memory: and read and execute instructions in the memory, to implement the method according to any one of the third aspect or the possible designs of the third aspect. Optionally, the communications apparatus may further include the memory. Optionally, the communications apparatus is a master base station.

According to a tenth aspect, an embodiment of this application provides a communications system, including the user equipment according to the fourth aspect or the seventh aspect, the secondary base station according to the fifth aspect or the eighth aspect, and the master base station according to the sixth aspect or the ninth aspect.

According to an eleventh aspect, an embodiment of this application provides a computer-readable storage medium, including instructions. When the instructions are run, the method according to any one of the first aspect, the second aspect, the third aspect, or the possible designs of the first aspect, the second aspect, or the third aspect is performed.

According to a twelfth aspect, an embodiment of this application provides a computer program product including instructions. When the computer program product runs, the method according to any one of the first aspect, the second aspect, the third aspect, or the possible designs of the first aspect, the second aspect, or the third aspect is performed.

Compared with the current technology, this application describes a communication method, apparatus, and system, aiming to quickly recover the connection between the user equipment and the master base station through the secondary base station, thereby reducing the transmission interruption time, and improving the system performance and user experience.

DETAILED DESCRIPTION OF EMBODIMENTS

The following describes technical solutions in embodiments of this application with reference to the accompanying drawings in the embodiments of this application.

In the descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

In addition, a network architecture and a service scenario described in the embodiments of this application are intended to help describe the technical solutions in the embodiments of this application, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

The technical solutions provided in the embodiments of this application may be applied to various communications systems, for example, a long term evolution (LTE) communications system, a new radio (NR) communications system using a 5th generation (5th generation, 5G) communications technology, a future evolved system, or a plurality of converged communications systems. The technical solutions provided in the embodiments of this application are particularly applicable to a scenario in which a dual connectivity (DC) technology is used. The dual connectivity technology described in this application may include dual connectivity in an LTE system, dual connectivity in a 5G system, or multi-radio access technology dual connectivity (multiple RATs dual connectivity) between LTE and 5G. In this application, nouns "network" and "system" are usually interchangeably used, but a person skilled in the art can understand meanings of the nouns.

Figure 1:
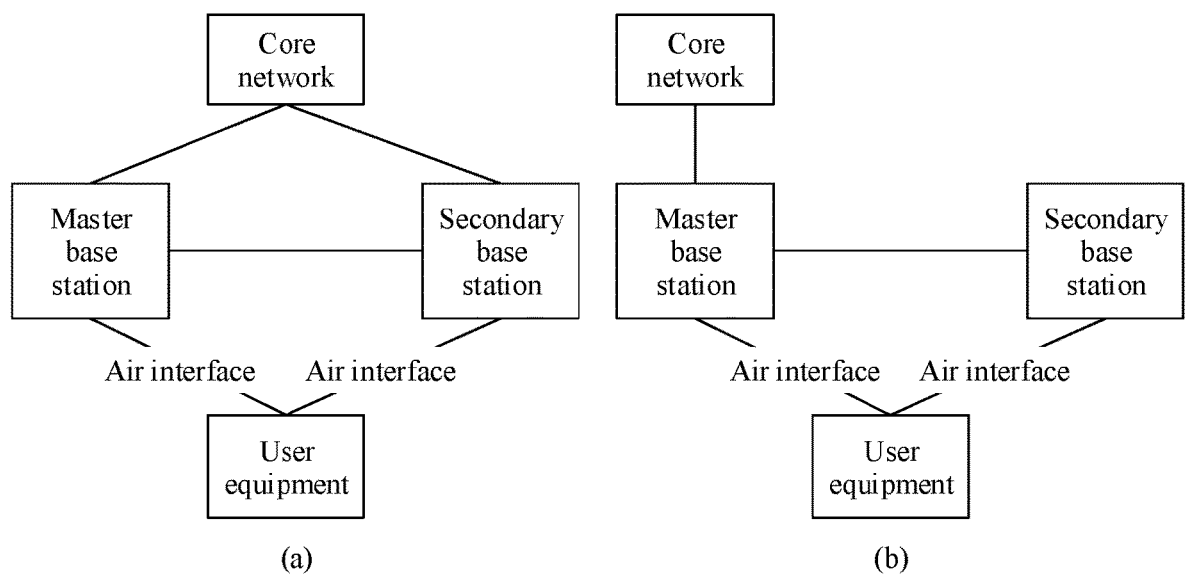
FIG. 1 is a schematic diagram of possible application scenarios according to an embodiment of this application.

FIG. 1 is a schematic diagram of two possible application scenarios in this application. User equipment (UE) accesses a master base station and a secondary base station through an air interface (or referred to as a wireless interface). The master base station and the secondary base station are connected to a core network. Specifically, in (a) in FIG. 1, a master base station and a secondary base station are connected to each other through an interface between the base stations, and are separately connected to a core network. In (b) in FIG. 1, a master base station and a secondary base station are connected to each other through an interface between the base stations, and the secondary base station is connected to a core network through the master base station. The core network in FIG. 1 may be a core network in an LTE system, for example, an evolved packet core (EPC), or may be a core network in a 5G system, for example, a 5G core (5GC). The master base station in FIG. 1 may also be referred to as a master node (MN) or an anchor. The master base station may be a base station in an LTE system, for example, an evolved NodeB (eNB or eNodeB) or a next generation-evolved NodeB (ng-eNB). Alternatively, the master base station may be a base station in a 5G system, for example, a gNB. The secondary base station in FIG. 1 may also be referred to as a secondary node (secondary node, SN). The secondary base station may be a base station in an LTE system, for example, an evolved NodeB (eNB or eNodeB) or a next generation-evolved NodeB (ng-eNB). Alternatively, the secondary base station may be a base station in a 5G system, for example, a gNB. Different types of core networks, master base stations, and secondary base stations may be combined to form different dual connectivity architectures. The embodiments provided in this application may be applied to various different dual connectivity architectures, and are not limited to the scenario shown in FIG. 1.

User equipment in this application may include various hand-held devices, vehicle-mounted devices, wearable devices, computing devices, or control devices with a wireless communication function, or other processing devices connected to a wireless modem, and UE, mobile stations (MS), terminals, terminal equipment, or the like in various forms. For ease of description, in this application, the foregoing devices are collectively referred to as user equipment (or UE).

A base station in this application includes a master base station or a secondary base station, and is a network side device that communicates with user equipment through a wireless interface (or an air interface). The base station may include macro base stations, micro base stations, relay stations, access points, remote radio units (RRU), or the like in various forms. Alternatively, the base station may be a base station in different systems, for example, may be an eNB or an ng-eNB in an LTE network, or may be a gNB in a 5G network.

The following describes some general concepts or definitions in the embodiments of this application.

A master node described in this application is also referred to as a master base station, is a master node in a dual connectivity technology, and may be an eNB, an ng-eNB, or a gNB. A serving cell group that is of the master node and that provides user equipment with a service is referred to as a master cell group (MCG), and the master cell group includes a primary serving cell (PCell) and one or more optional secondary serving cells (SCell). A bearer for which a packet data convergence protocol (PDCP) is terminated on the master node is referred to as a master node terminated bearer (MN terminated bearer). For this type of bearer, a PDCP on a base station side is deployed on the master node, and a PDCP layer of the master node performs security-related processing. When a bearer uses only an air interface resource of a master node to send a PDCP packet data unit (PDU), the bearer is referred to as an MCG bearer. When a bearer uses air interface resources of both a master node and a secondary node to send PDCP PDUs, the bearer is referred to as a split bearer. If the bearer is also an MN bearer, the bearer is referred to as an MCG split bearer (MCG split bearer).

A secondary node described in this application is also referred to as a secondary base station, is a secondary node in a dual connectivity technology, and may be an eNB, an ng-eNB, or a gNB. A serving cell group that is of the secondary node and that provides user equipment with a service is referred to as a secondary cell group (SCG), and the secondary cell group includes a primary serving cell (PCell) and one or more optional secondary serving cells (SCell). A bearer for which a PDCP is terminated on the secondary node is referred to as a secondary node terminated bearer (SN terminated bearer). For this type of bearer, a PDCP on a base station side is deployed on the secondary node, and a PDCP layer of the secondary node performs security-related processing. If a split bearer is also an SN bearer, the split bearer is referred to as an SCG split bearer.

The master node or the secondary node in this application may be referred to as a network node.

A signaling radio bearer (SRB) described in this application is a bearer used to transmit radio resource control (RRC) signaling. An SRB 1 and an SRB 2 in this application are defined as a type of MN bearer, and may be MCG bearers or MCG split bearers. When the SRB is a split bearer, the SRB may be referred to as a split SRB. An SRB 3 in this application is defined as a type of SN bearer, and is also an SCG bearer.

A data radio bearer (DRB) described in this application is a bearer that is established between a master node and user equipment or between a secondary node and user equipment and that is used to transmit data.

The following describes in more detail the solutions provided in the embodiments of this application with reference to the accompanying drawings.

Figure 2:
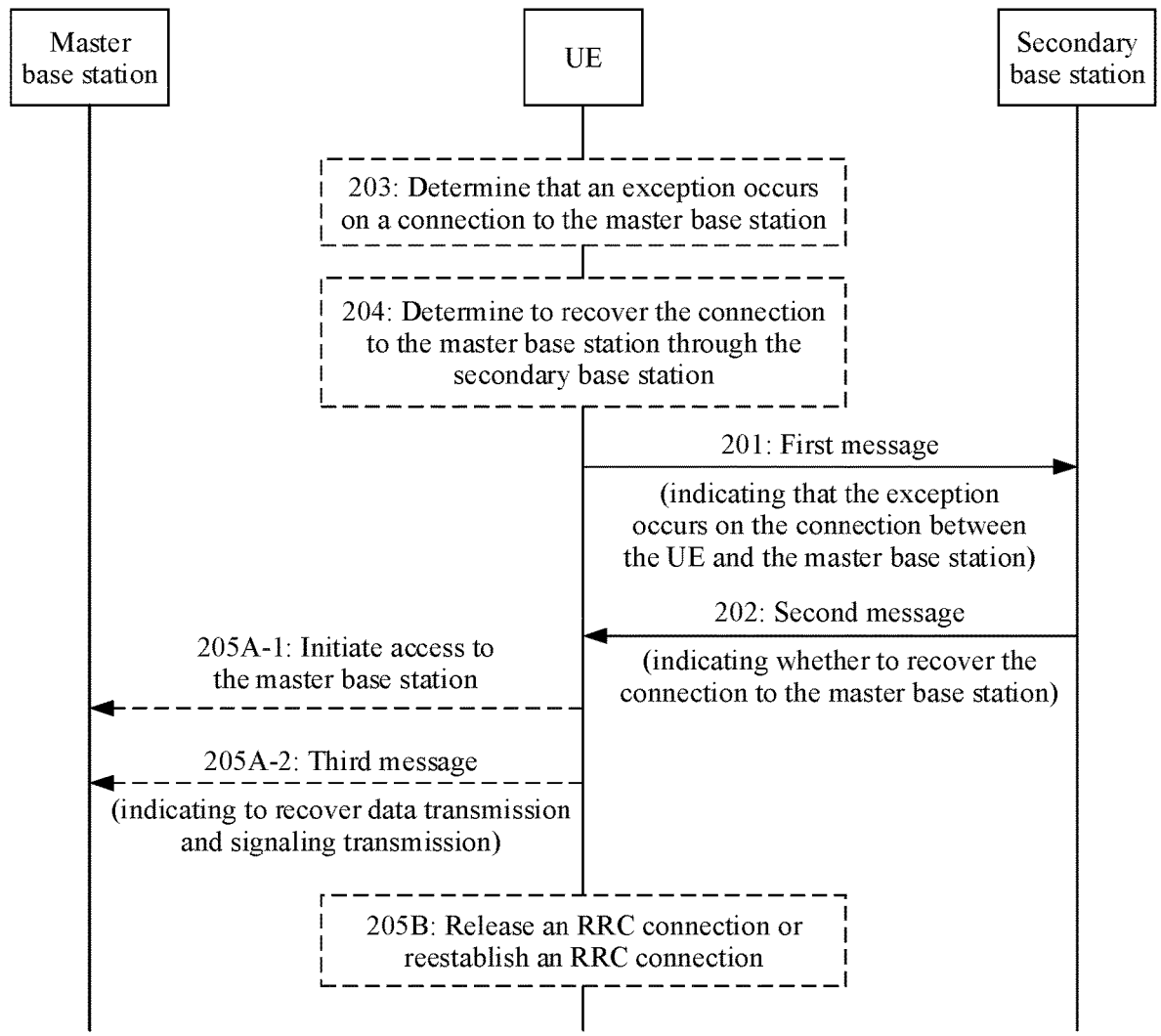
FIG. 2 is a signaling flowchart of a communication method according to an embodiment of this application.

FIG. 2 is a signaling flowchart of a communication method according to an embodiment of this application.

In part 201, UE sends a first message to a secondary base station, to indicate that an exception occurs on a connection between the UE and a master base station.

Optionally, the first message may explicitly or implicitly indicate, in different manners or by using different information, that the exception occurs on the connection between the UE and the master base station.

In an example, the first message may include measurement information of the UE for the master base station, for example, a measurement report. The measurement report may be a measurement result obtained based on a measurement configuration of the master base station and/or the secondary base station. The measurement information of the UE for the master base station includes a measurement indicator or quality information of the connection between the UE and the master base station, and may be used to indicate whether an exception occurs on the connection between the UE and the master base station.

In an example, the first message may include information about a type of the exception. Optionally, the exception (or the type of the exception) may include at least one of a radio link failure (RLF), an integrity check failure (which may also be referred to as an integrity protection check failure), an RRC reconfiguration failure, an RRC connection reestablishment failure, a security parameter configuration exception, and a handover failure. The integrity check is a check, of integrity or security, performed by a PDCP layer at a receive end on signaling transmitted on an SRB and/or data transmitted on a DRB. An operation that is corresponding to the integrity check and that is performed at a transmit end of the signaling and/or data is referred to as integrity protection. The integrity check failure may include an SRB integrity check failure and/or a DRB integrity check failure. Handover may be intra-system handover, inter-system handover, intra-standard handover, or inter-standard handover. The information about the type of the exception in the first message may directly indicate that the exception occurs between the UE and the master base station. The type of the exception may further include another exception event defined by a system or the UE. This is not limited in this application.

Certainly, the first message may include both the measurement information and the information about the type of the exception. Alternatively, the first message may indicate, in another manner, that the exception occurs between the UE and the master base station. This is not limited in this application.

Before sending the first message, the UE may determine, by monitoring signal quality of the master base station, whether an exception occurs on the connection to the master base station (part 203). Specifically; monitoring the signal quality of the master base station may include detecting signal quality of at least one cell in an MCG, for example, signal quality of entire bandwidth, signal quality of a part of bandwidth, or signal quality of a beam. Specifically, the signal quality may be represented by information such as reference signal received power (RSRP), reference signal received quality (RSRQ), and channel state information (CSI), or may be represented by a data receiving and sending status at a physical layer or a radio link control (RLC) layer, for example, a bit error rate, a packet loss rate, or a quantity of retransmissions.

When the exception occurs on the connection between the UE and the master base station, the UE may directly send the first message to notify, to a network side, that the exception occurs, and then perform a next operation based on an indication of the network side. That is, the UE considers that the connection between the UE and the master base station can be recovered through the secondary base station as long as the exception of the master base station occurs. Alternatively, the UE may determine, based on specific information of the master base station, whether to recover the connection between the UE and the master base station through the secondary base station (part 204). If determining that the connection to the master base station needs to be recovered through the secondary base station, the UE sends the first message.

Specifically, the UE may determine, based on the measurement information for the master base station and/or the type of the exception, whether to recover the connection between the UE and the master base station through the secondary base station. The measurement information for the master base station may be measurement information of the signal quality of the at least one cell in the MCG.

In an example, the UE may determine, based on the measurement information for the master base station, whether the master base station recovers the connection through the secondary base station. For example, the UE may perform cell selection or cell reselection. If a selection result is a cell in the MCG, it may be considered that it is suitable for the master base station to recover the connection through the secondary base station. For another example, the UE may determine link quality of at least one cell, for example, a PCell, in the MCG. If a link of at least one cell meets a preset condition (for example, signal quality is higher than a preset threshold), it is considered that it is suitable for the master base station to recover the connection through the secondary base station.

In another example, the UE may determine, based on the type of the exception of the master base station, whether to recover the connection through the secondary base station. For example, at least one specific type of exception for which the connection can be recovered through the secondary base station may be predetermined. When the exception of the master base station is of the specific type, it is considered that the connection between the UE and the master base station can be recovered through the secondary base station. The specific type may be at least one of the radio link failure, the integrity check failure, the RRC reconfiguration failure, the RRC connection reestablishment failure, the security parameter configuration exception, and the handover failure. In a specific example, if the specific type includes the DRB integrity check failure but does not include the SRB integrity check failure, when the exception of the master base station is the SRB integrity check failure, it is considered that the connection to the master base station cannot be recovered through the secondary base station: when the exception of the master base station is the DRB integrity check failure, it is considered that the connection to the master base station can be recovered through the secondary base station. In another specific example, the specific type includes the RRC reconfiguration failure, that is, when the exception of the master base station is the RRC reconfiguration failure, the UE may determine to recover the connection to the master base station through the secondary base station.

In another example, the UE may determine, based on both the measurement information for the master base station and the type of the exception, whether to recover the connection to the master base station through the secondary base station. For example, when the exception of the master base station is the radio link failure, the measurement information for the master base station may be further determined. If a measurement result for the master base station meets a requirement, for example, at least one cell in the MCG meets a cell selection or cell reselection condition, or signal quality of at least one cell in the MCG meets a preset condition, it is considered that the connection to the master base station can be recovered through the secondary base station.

Optionally, the UE may send the first message to the secondary base station by using a split SRB or an SRB 3. Further, optionally, the UE may preferentially send the first message on the split SRB or the SRB 3. In a specific example, the UE may first determine whether a split SRB (for example, a split SRB 1) is configured between the UE and the secondary base station. If a split SRB is configured, the UE sends the first message by using the split SRB: if no split SRB is configured, the UE does not send the first message or transmits the first message by using an SRB 3. In another specific example, the UE may first determine whether an SRB 3 is configured between the UE and the secondary base station. If an SRB 3 is configured, the UE sends the first message by using the SRB 3: if no SRB 3 is configured, the UE does not send the first message or transmits the first message by using a split SRB.

Optionally, after determining that the exception occurs on the connection between the UE and the master base station, or before sending the first message, the UE may further stop data transmission with the secondary base station, and may also stop data transmission and signaling transmission that are performed with the master base station by using an air interface resource of the master base station. This avoids a security mechanism problem that may be caused after MCG data transmission is subsequently recovered, thereby simplifying signaling procedure in a security process.

In part 202, the secondary base station sends a second message to the UE.

Optionally, the second message may explicitly or implicitly indicate, in different manners or by using different information, whether the UE recovers the connection to the master base station.

In an example, the second message may include access information of the master base station, to indicate that the UE can recover the connection to the master base station. The access information of the master base station is access information of at least one cell in the MCG that is of the master base station and that provides a service, for example, access information of a PCell in the MCG. Optionally, the access information may include at least one of the following information: cell identifier information of the master base station, random access channel resource information of the at least one cell in the MCG of the master base station, a cell radio network temporary identifier (C-RNTI) configured by the master base station for the UE, security configuration information, and configuration information of an SRB 1.

In a specific example, when the second message includes the security configuration information, the security configuration information may be used to indicate whether the UE needs to update a key and/or how to update the key. The key is a key used to encrypt data and/or signaling during communication (for example, data transmission and/or signaling transmission) between the UE and the master base station, or a key used to perform integrity protection on data and/or signaling. Optionally, the UE may determine, based on the security configuration information, a first key used for RRC message encryption and/or a second key used for integrity protection.

In another example, the second message may include RRC connection reestablishment indication information or RRC connection release indication information, to indicate the UE not to recover the connection to the master base station, but to perform RRC connection reestablishment or RRC connection release (part 205B).

Optionally, in part 205A-1, when the second message includes the access information of the master base station, or when the second message indicates that the UE can recover the connection to the master base station, the UE may initiate access to the master base station based on the second message.

Optionally, in part 205A-2, after successfully accessing the master base station, the UE may further send a third message to the master base station, to indicate to recover the data transmission and the signaling transmission with the master base station. In a specific example, the UE may encrypt the third message by using the first key and/or perform integrity protection on the third message by using the second key, where the first key and the second key are determined based on the security configuration information.

Optionally, the UE may further send a fourth message to the secondary base station, to indicate to recover the data transmission between the UE and the secondary base station.

It may be understood that, in another case different from part 202, the second message may alternatively be directly sent to the UE through the master base station. This case usually occurs when a downlink between the UE and the master base station can still be normally used for communication. Optionally, the master base station may send the second message by using a split SRB. In this case, an implementation related to the second message in part 202 in the foregoing embodiment may still be applicable, and implementations in parts 205A-1, 205A-2, and 205B may also be applicable.

It may be understood that, in another case different from that in the embodiment shown in FIG. 2, the UE may also determine, according to a related example (for example, part 203 and/or part 204) in the embodiment shown in FIG. 2, that the exception occurs on the connection to the master base station, but may determine not to recover the connection between the UE and the master base station through the secondary base station. In this case, the UE may not send the first message, but may perform a procedure or an operation of reestablishing an RRC connection, releasing an RRC connection, entering an RRC idle mode, or the like.

Figure 3:
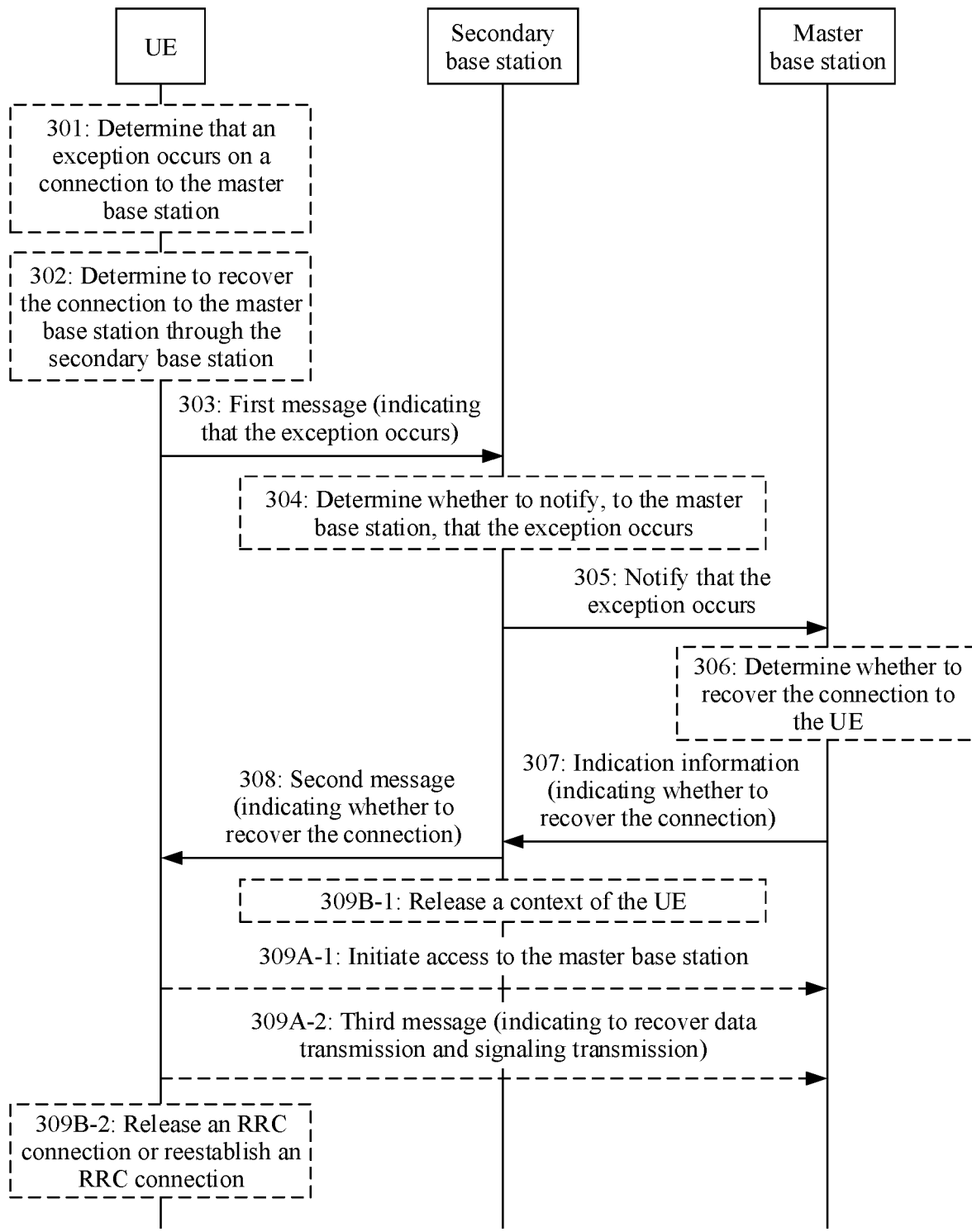
FIG. 3 is a signaling flowchart of another communication method according to an embodiment of this application.

FIG. 3 is a signaling flowchart of another communication method according to an embodiment of this application.

In part 303, UE sends a first message to a secondary base station, to indicate that an exception occurs on a connection between the UE and a master base station. For a specific implementation of part 303, refer to part 201 in the embodiment shown in FIG. 2.

Optionally, in part 301, the UE determines that the exception occurs on the connection to the master base station. For a specific implementation of part 301, refer to part 203 in the embodiment shown in FIG. 2.

Optionally, in part 302, the UE determines to recover the connection to the master base station through the secondary base station. For a specific implementation of part 302, refer to part 204 in the embodiment shown in FIG. 2.

Optionally, in part 304, if the UE sends the first message to the secondary base station by using an SRB 3, the secondary base station may determine, based on information in the first message, whether to notify; to the master base station, that the exception occurs on the connection between the UE and the master base station.

In a specific example, the secondary base station may determine, based on measurement information of the UE for the master base station and/or information about a type of the exception in the first message, whether to notify, to the master base station, that the exception occurs.

In an example, the secondary base station may determine, based on the measurement information of the UE for the master base station, whether to notify, to the master base station, that the exception occurs. For example, the secondary base station may determine, based on the measurement information, link quality of at least one cell, for example, a PCell, in an MCG. If a link of at least one cell meets a preset condition (for example, signal quality is higher than a preset threshold), it is considered that the secondary base station may notify, to the master base station, that the exception occurs.

In another example, the secondary base station may determine, based on the type of the exception of the master base station, whether to notify, to the master base station, that the exception occurs. For example, at least one specific type of exception for which the connection can be recovered through the secondary base station may be predetermined. When the exception of the master base station is of the specific type, it is considered that the connection between the UE and the master base station can be recovered through the secondary base station. In this case, the secondary base station may notify, to the master base station, that the exception occurs. The specific type may be at least one of a radio link failure, an integrity check failure, an RRC reconfiguration failure, an RRC connection reestablishment failure, a security parameter configuration exception, and a handover failure. In a specific example, if the specific type includes a DRB integrity check failure but does not include an SRB integrity check failure, when the exception of the master base station is the SRB integrity check failure, it is considered that the connection to the master base station cannot be recovered through the secondary base station. In this case, the secondary base station may not notify, to the master base station, that the exception occurs. However, when the exception of the master base station is the DRB integrity check failure, it is considered that the connection to the master base station can be recovered through the secondary base station. In this case, the secondary base station may notify, to the master base station, that the exception occurs. In another specific example, the specific type includes the RRC reconfiguration failure, that is, when the exception of the master base station is the RRC reconfiguration failure, it is considered that the connection to the master base station can be recovered through the secondary base station. In this case, the secondary base station may notify, to the master base station, that the exception occurs.

In another example, the secondary base station may determine, based on both the measurement information of the UE for the master base station and the type of the exception, whether to notify, to the master base station, that the exception occurs. For example, when the exception of the master base station is the radio link failure, the measurement information for the master base station may be further determined. If a measurement result for the master base station meets a requirement, for example, at least one cell in the MCG meets a cell selection or cell reselection condition, or signal quality of at least one cell in the MCG meets a preset condition, it is considered that the connection to the master base station can be recovered through the secondary base station. In this case, the secondary base station may notify, to the master base station, that the exception occurs.

In part 305, the secondary base station notifies, to the master base station, that the exception occurs on the connection between the UE and the master base station.

Optionally, the first message may be included in a notification. Optionally, the notification may include the measurement information of the UE for the master base station and/or the information about the type of the exception.

Optionally, the notification may be performed by using different signaling or messages. This is not limited in this application.

In an example, when the secondary base station receives the first message on a split SRB, the secondary base station may transmit, through an interface (for example, an Xn interface) between the secondary base station and the master base station, the first message by including the first message, as an RRC container, in an interface message (for example, an XnAP message).

In an example, after the secondary base station receives the first message on an SRB 3, the secondary base station parses the first message, and notifies, to the master base station based on an interface (for example, an Xn interface) message between the secondary base station and the master base station, that the exception occurs on the connection between the UE and the master base station. Optionally, the interface message includes the type of the exception and/or the measurement information.

Optionally, in part 306, the master base station determines, based on the notification of the secondary base station, whether to recover the connection to the UE. In an example, the master base station may determine, based on the measurement information of the UE for the master base station and/or the information about the type of the exception, whether to recover the connection to the UE. For a specific determining method, refer to an implementation, in the embodiment shown in FIG. 2, in which the UE determines, based on the foregoing information, whether to recover the connection to the master base station through the secondary base station. Optionally, the master base station may further determine, with reference to other information such as load information, whether to recover the connection to the UE.

In part 307, the master base station sends indication information to the secondary base station, to indicate whether to recover the connection between the master base station and the UE.

Optionally, the indication information may be sent by using different messages or signaling. This is not limited in this application.

In an example, the indication information may be carried, as an RRC container, in an Xn application protocol (XnAP) message, for example, carried in an RRC transfer message.

In an example, the indication information may be access information of the master base station, and indicates to recover the connection between the UE and the master base station. Optionally, the indication information may be carried in an SN modification request message in an XnAP message.

In an example, the indication information may be RRC connection reestablishment indication information or RRC connection release indication information, and indicates not to recover the connection between the UE and the master base station. Optionally, the indication information may be carried in an SN release message.

In part 308, the secondary base station sends a second message to the UE, to indicate whether to recover the connection between the UE and the master base station. Optionally, the second message includes the indication information sent by the master base station to the secondary base station. For a specific implementation of part 308, refer to part 202 in the embodiment shown in FIG. 2.

Optionally, in part 309A-1, if the second message indicates to recover the connection between the UE and the master base station, the UE initiates access to the master base station based on information in the second message. For a specific implementation of part 309A-1, refer to part 205A-1 in the embodiment shown in FIG. 2.

Optionally, in part 309A-2, after successfully accessing the master base station, the UE may send a third message to the master base station, to indicate to recover data transmission and signaling transmission. For a specific implementation of part 309A-2, refer to part 205A-2 in the embodiment shown in FIG. 2. Optionally, the UE may further send a fourth message to the secondary base station, to indicate to recover data transmission between the UE and the secondary base station.

Optionally, in part 309B-1, if the indication information or the second message indicates not to recover the connection between the UE and the master base station, the secondary base station may release a context of the UE.

Optionally, in part 309B-2, if the second message indicates not to recover the connection between the UE and the master base station, the UE releases an RRC connection or reestablishes an RRC connection based on information in the second message. For a specific implementation of part 309B-2, refer to part 205B in the embodiment shown in FIG. 2.

In the foregoing embodiment, optionally, a message between the UE and the secondary base station may be sent and received by using a split SRB or an SRB 3.

It may be understood that, in the embodiment shown in FIG. 2 or FIG. 3, a sequence of the steps may be adjusted based on a requirement, and is not limited to a specific sequence provided in the example. In addition, in the embodiment shown in FIG. 3, a signaling procedure between the secondary base station and the master base station, for example, one or more steps in part 304, part 305, part 306, part 307, and part 309B-1, may not be used in combination with an action in another part in FIG. 3, but is separately used as a communication method, to notify, through the secondary base station, the master base station of the exception occurring between the user equipment and the master base station and determine how to process the connection between the user equipment and the master base station.

With reference to or independent of the foregoing embodiments, this application further provides a communication method, to exchange power headroom type information of UE between network nodes.

Power headroom (PH) is information that is used for power control and that is reported by UE to a base station through a media access control control element (MAC CE) based on scheduling of the base station. The power headroom indicates a difference between maximum transmit power and transmission power of the UE in an activated cell. The base station may select an appropriate modulation and coding scheme (MCS) and resource size for uplink transmission of the UE based on a power headroom report (PHR), to improve resource utilization.

When a dual connectivity technology is introduced into a communications system, a base station needs to know power overheads of UE on all uplink carriers. When a PHR is triggered in a MAC entity, the MAC entity needs to report, to the base station, power headroom on all activated carriers of another MAC entity.

In an LTE system, three PH types are defined:
Type 1: When power headroom of an activated cell c is calculated, only transmit power of a PUSCH is calculated.
Type 2: When power headroom of an activated cell c is calculated, transmit power of a PUSCH and transmit power of a PUCCH are calculated.
Type 3: When power headroom of an activated cell c is calculated, transmit power of an SRS is calculated.

In a 5G system, two PH types are defined:
Type 1: When power headroom of an activated cell c is calculated, only transmit power of a PUSCH is calculated.
Type 3: When power headroom of an activated cell c is calculated, transmit power of an SRS is calculated.

Based on different PH types defined in different systems, when a dual connectivity technology is used, if one of a master node or a secondary node is a 5G base station (for example, a gNB), and the other one is an LTE base station (for example, an eNB or an ng-eNB), the base stations do not know a power headroom type used when the peer end reports a PHR MAC CE. If a node does not know a power headroom type of a node on the other side, an error occurs during use of power headroom.

Figure 4:
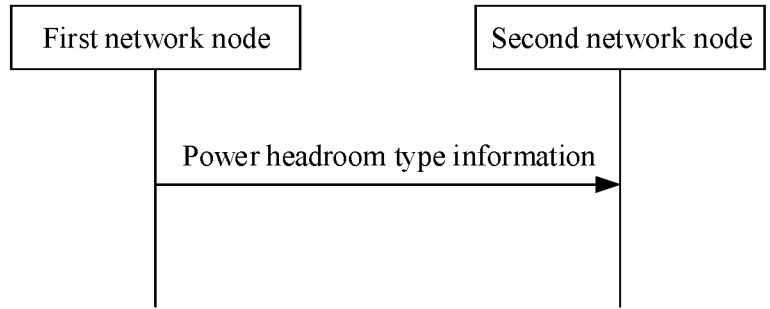
FIG. 4 is a signaling flowchart of still another communication method according to an embodiment of this application.

This application provides a communication method, aiming to exchange power headroom type information between network nodes. The method is shown in FIG. 4.

A first network node sends, to a second network node, power headroom type information configured by the first network node for user equipment.

Optionally, the first network node is a gNB or a gNB-CU, and the second network node is one of a gNB, a gNB-CU, an eNB, or an ng-eNB. CU is a central unit (CU), and the gNB-CU is a central unit of a 5G base station in a CU-DU structure.

Optionally, the first network node is an eNB or an ng-eNB, and the second network node is a gNB or a gNB-CU.

Optionally, the power headroom type information is sent by using an inter-node message.

Optionally, the first network node is a gNB-CU, and the second network node is a gNB-DU. The gNB-DU is a distributed unit (DU) of a 5G base station in a CU-DU structure.

In a specific example, the first network node is an eNB, an ng-eNB, or a gNB-CU, the second network node is a gNB-CU, and the method further includes: The second network node sends the power headroom type information to a third network node, where the third network node is a gNB-DU that belongs to a same gNB as the second network node. The gNB-CU sends the power headroom type information to the gNB-DU, so that the gNB-DU can use the information to perform power control.

In the foregoing embodiments provided in this application, the communication method provided in the embodiments of this application is described separately from a perspective of each network element and from a perspective of interaction between network elements. It may be understood that to implement the foregoing functions, each network element, such as the UE, the master base station, or the secondary base station, includes a corresponding hardware structure and/or software module for performing each function. A person skilled in the art should easily be aware that, in combination with units and algorithm steps of the examples described in the embodiments disclosed in this application, this application can be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
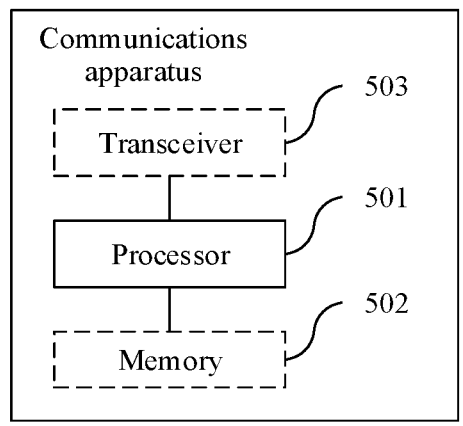
FIG. 5 is a structural diagram of a communications apparatus according to an embodiment of this application.

FIG. 5 is a possible schematic structural diagram of a communications apparatus according to an embodiment of this application.

Optionally, the communications apparatus may be user equipment, or a part of apparatus or circuit system in user equipment, for example, may be a chip system. The chip system includes at least one chip, and may further include another discrete component or circuit structure.

In a specific example, the communications apparatus includes a processor 501, and the processor 501 is configured to: be coupled to a memory: and read and execute instructions in the memory, to implement the method performed by the user equipment in the embodiment shown in FIG. 2 or FIG. 3. Optionally, the communications apparatus may further include the memory 502, configured to store the instructions. Optionally, the communications apparatus may further include a transceiver 503, configured to support the communications apparatus in receiving and/or sending the message or information in the foregoing method.

Figure 6:
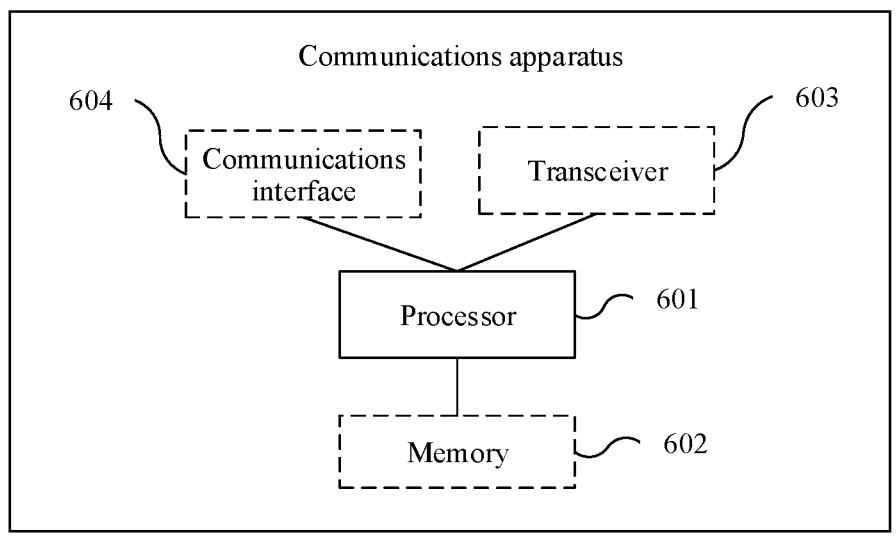
FIG. 6 is a structural diagram of another communications apparatus according to an embodiment of this application.

FIG. 6 is a possible schematic structural diagram of another communications apparatus according to an embodiment of this application.

Optionally, the communications apparatus may be a network node, for example, the master base station, the secondary base station, the gNB, the eNB, the ng-eNB, the gNB-CU, or the gNB-DU in the embodiments of this application, or may be a part of apparatus or circuit system in a network node, for example, may be a chip system. The chip system includes at least one chip, and may further include another discrete component or circuit structure.

In a specific example, the communications apparatus includes a processor 601, and the processor 601 is configured to: be coupled to a memory: and read and execute instructions in the memory; to implement the method performed by the secondary base station in the embodiment shown in FIG. 2 or FIG. 3. Optionally, the communications apparatus may further include the memory 602, configured to store the instructions. Optionally, the communications apparatus may further include a transceiver 603, configured to support the communications apparatus in communicating with user equipment, for example, in receiving and/or sending the message or information exchanged with the user equipment in the foregoing method. Optionally, the communications apparatus may further include a communications interface 604, configured to support the communications apparatus in communicating with another network device (for example, a master base station), for example, in receiving and/or sending the information or message exchanged with the master base station in the foregoing method.

In another specific example, the communications apparatus includes a processor 601, and the processor 601 is configured to: be coupled to a memory: and read and execute instructions in the memory, to implement the method performed by the master base station in the embodiment shown in FIG. 2 or FIG. 3. Optionally, the communications apparatus may further include the memory 602, configured to store the instructions. Optionally, the communications apparatus may further include a transceiver 603, configured to support the communications apparatus in communicating with user equipment, for example, in receiving and/or sending the message or information exchanged with the user equipment in the foregoing method. Optionally, the communications apparatus may further include a communications interface 604, configured to support the communications apparatus in communicating with another network device (for example, a secondary base station), for example, in receiving and/or sending the information or message exchanged with the secondary base station in the foregoing method.

In still another specific example, the communications apparatus includes a processor 601, and the processor 601 is configured to: be coupled to a memory: and read and execute instructions in the memory, to implement the method performed by the first network node or the second network node in the embodiment shown in FIG. 4. Optionally, the communications apparatus may further include the memory 602, configured to store the instructions. Optionally, the communications apparatus may further include a transceiver 603, configured to support the communications apparatus in communicating with user equipment. Optionally, the communications apparatus may further include a communications interface 604, configured to support the communications apparatus in communicating with another network node, for example, in receiving and/or sending the information or message exchanged with the another network node in the foregoing method.

The processor used to implement the communications apparatus in this application may be a central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The method or algorithm steps described with reference to the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium and write information into the storage medium. Certainly, the storage medium may also be a component of the processor. The processor and the storage medium may be located in an ASIC. In addition, the ASIC may be located in the communications apparatus. Certainly, the processor and the storage medium may alternatively exist in the communications apparatus as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement or improvement made based on the technical solutions of this application shall fall within the protection scope of this application.

What is claimed is:

1. A communication method, comprising:
    sending, by a user equipment, a first message to a secondary base station, wherein the first message indicates that an exception occurs on a connection between the user equipment and a master base station; and
    receiving, by the user equipment and after sending the first message to the secondary base station, a second message from the secondary base station, wherein the second message indicates whether to recover the connection between the user equipment and the master base station, and wherein the second message indicating whether to recover the connection between the user equipment and the master base station comprises the second message indicating to recover the connection between the user equipment and the master base station when the second message comprises access information of the master base station.

2. The method according to claim 1, wherein the first message comprises at least one of measurement information of the user equipment for the master base station or information about a type of the exception.

3. The method according to claim 2, wherein the type of the exception comprises at least one of the following types:
    a radio link failure, an integrity check failure, a radio resource control (RRC) reconfiguration failure, or a handover failure.

4. The method according to claim 1, wherein the second message indicates to recover the connection between the user equipment and the master base station, and the second message comprises the access information of the master base station, and wherein the method further comprises:
    initiating, by the user equipment, access to the master base station based on the access information.

5. The method according to claim 4, wherein the access information comprises at least one of the following information:
    cell identifier information of the master base station, random access channel resource information of a cell of the master base station, a cell radio network temporary identifier of the user equipment, security configuration information, or configuration information of a signaling radio bearer 1 (SRB 1).

6. The method according to claim 4, wherein the access information comprises security configuration information, and wherein the method further comprises:
    determining, by the user equipment based on the security configuration information, a first key used for RRC message encryption or a second key used for integrity protection; and
    sending, by the user equipment, a third message to the master base station, wherein the RRC message encryption is performed on the third message by using the first key or the integrity protection is performed on the third message by using the second key, and the third message indicates that the user equipment has recovered data transmission and signaling transmission with the master base station.

7. The method according to claim 1, wherein the second message indicates not to recover the connection between the user equipment and the master base station, and the second message comprises RRC connection reestablishment indication information or RRC connection release indication information.

8. A communications apparatus, comprising:
    at least one processor; and
    at least one memory coupled to the at least one processor and storing programming instructions for execution by the at least one processor to:
        send a first message to a secondary base station, wherein the first message indicates that an exception occurs on a connection between a user equipment and a master base station; and
        receive a second message after sending the first message to the secondary base station, wherein the second message is sent by the secondary base station and indicates whether to recover the connection between the user equipment and the master base station, and wherein the second message indicating whether to recover the connection between the user equipment and the master base station comprises the second message indicating to recover the connection between the user equipment and the master base station when the second message comprises access information of the master base station.

9. The apparatus according to claim 8, wherein the first message comprises at least one of measurement information of the user equipment for the master base station or information about a type of the exception.

10. The apparatus according to claim 9, wherein the type of the exception comprises at least one of the following types:
a radio link failure, an integrity check failure, a radio resource control (RRC) reconfiguration failure, or a handover failure.

11. The apparatus according to claim 8, wherein the second message indicates to recover the connection between the user equipment and the master base station, and the second message comprises the access information of the master base station, and wherein the memory further comprises instructions that, when executed by the at least one processor, cause the apparatus to:
initiate access to the master base station based on the access information.

12. The apparatus according to claim 11, wherein the access information comprises at least one of the following information:
cell identifier information of the master base station, random access channel resource information of a cell of the master base station, a cell radio network temporary identifier of the user equipment, security configuration information, or configuration information of a signaling radio bearer 1 (SRB 1).

13. The apparatus according to claim 11, wherein the access information comprises security configuration information, and wherein the memory further comprises instructions that, when executed by the at least one processor, cause the apparatus to:
determine, based on the security configuration information, a first key used for RRC message encryption or a second key used for integrity protection; and
send a third message to the master base station, wherein the RRC message encryption is performed on the third message by using the first key or the integrity protection is performed on the third message by using the second key, and the third message indicates that the user equipment has recovered data transmission and signaling transmission with the master base station.

14. The apparatus according to claim 8, wherein the second message indicates not to recover the connection between the user equipment and the master base station, and the second message comprises RRC connection reestablishment indication information or RRC connection release indication information.

15. A communications system, comprising:
a master base station; and
a secondary base station, wherein the secondary base station comprises:
at least one processor; and
at least one memory coupled to the at least one processor and storing programming instructions for execution by the at least one processor to:
receive a first message from a user equipment, wherein the first message indicates that an exception occurs on a connection between the user equipment and a master base station;
send notification information to the master base station to notify that the exception occurs on the connection between the user equipment and the master base station;
receive, after sending the notification information to the master base station, indication information from the master base station, wherein the indication information indicates whether to recover the connection between the user equipment and the master base station, and wherein the indication information indicating whether to recover the connection between the user equipment and the master base station comprises the indication information indicating to recover the connection between the user equipment and the master base station when the indication information comprises access information of the master base station; and
send a second message to the user equipment, wherein the second message comprises the indication information; and
wherein the master base station is configured to:
receive the notification information from the secondary base station; and
send the indication information to the secondary base station.

16. The system according to claim 15, wherein the notification information comprises at least one of measurement information of the user equipment for the master base station or information about a type of the exception, and wherein the master base station is further configured to determine, based on the notification information, whether to recover the connection between the user equipment and the master base station.

17. The system according to claim 15, wherein:
the indication information is the access information of the master base station, and the second message indicates to recover the connection between the user equipment and the master base station; or
the indication information is radio resource control (RRC) connection reestablishment indication information or RRC connection release indication information, and the second message indicates not to recover the connection between the user equipment and the master base station.

18. The system according to claim 15, wherein the first message and the second message are transmitted via a split signaling radio bearer respectively.

19. The system according to claim 15, wherein:
the first message is transmitted via a signaling radio bearer 3 (SRB 3) which is directly established between the secondary base station and the user equipment; and
the secondary base station is further configured to determine, based on the first message, that the exception occurs on the connection between the user equipment and the master base station needs to be notified to the master base station.

20. The system according to claim 15, wherein the second message indicates not to recover the connection between the user equipment and the master base station, and wherein the secondary base station is further configured to release a context of the user equipment.

21. The method according to claim 1, wherein the first message comprises measurement information of the user equipment for the master base station.

* * * * *